United States Patent [19]

Ebeling et al.

[11] 4,288,230

[45] Sep. 8, 1981

[54] METHOD AND A DEVICE FOR THE PRODUCTION OF A SOLID-FORMING OR FOAM-FORMING FLOWABLE REACTION MIXTURE

[75] Inventors: Wilfried Ebeling, Cologne; Volkmar Tennemann, Leverkusen, both of Fed. Rep. of Germany

[73] Assignee: Bayer Aktiengesellschaft, Leverkusen, Fed. Rep. of Germany

[21] Appl. No.: 175,818

[22] Filed: Aug. 6, 1980

[30] Foreign Application Priority Data

Aug. 17, 1979 [DE] Fed. Rep. of Germany ....... 2933327

[51] Int. Cl.³ .................. G01N 23/14; B29D 27/02
[52] U.S. Cl. ............................. 23/230 A; 73/196; 250/356; 422/62; 364/500
[58] Field of Search .................. 23/230 A; 422/62; 73/195, 196; 250/527, 356; 364/500

[56] References Cited

U.S. PATENT DOCUMENTS

| | | | |
|---|---|---|---|
| 2,953,681 | 9/1960 | Frazier | 250/356 |
| 2,968,721 | 1/1961 | Shapiro et al. | 250/356 X |
| 4,050,896 | 9/1977 | Raffel et al. | 23/230 A |
| 4,195,527 | 4/1980 | Ebeling et al. | 73/434 |

*Primary Examiner*—Ronald Serwin

*Attorney, Agent, or Firm*—Gene Harsh; Joseph C. Gil; Lyndanne M. Whalen

[57] ABSTRACT

The present invention relates to a process and apparatus for preparing flowable reaction mixtures. The process comprises
 (a) measuring the volumetric rate of flow of at least one of said reactants which contains dissolved gas,
 (b) measuring the density of at least the same reactant noted in step (a) by radiometry successively under high pressure and low pressure,
 (c) determining the quantitative rate of flow of the reactant noted in steps (a) and (b) from the measurements of steps (a) and (b),
 (d) controlling the quantitative rate of flow of the reactant noted in steps (a) and (b) by comparing the quantitative rate determined in step (c) with a predetermined set value, and when necessary, adjusting said quantitative rate of flow,
 (e) controlling the amount of dissolved gas contained in the reactant noted in steps (a) and (b) by comparing the high pressure density measurement with the low pressure density measurement noted in step (b), the low pressure density measurement serving as a gauge for the gas charge, and when necessary, adjusting said amount of dissolved gas,
 (f) feeding said flowable reactants to a mixing zone, and
 (g) mixing said reactants.

11 Claims, 1 Drawing Figure

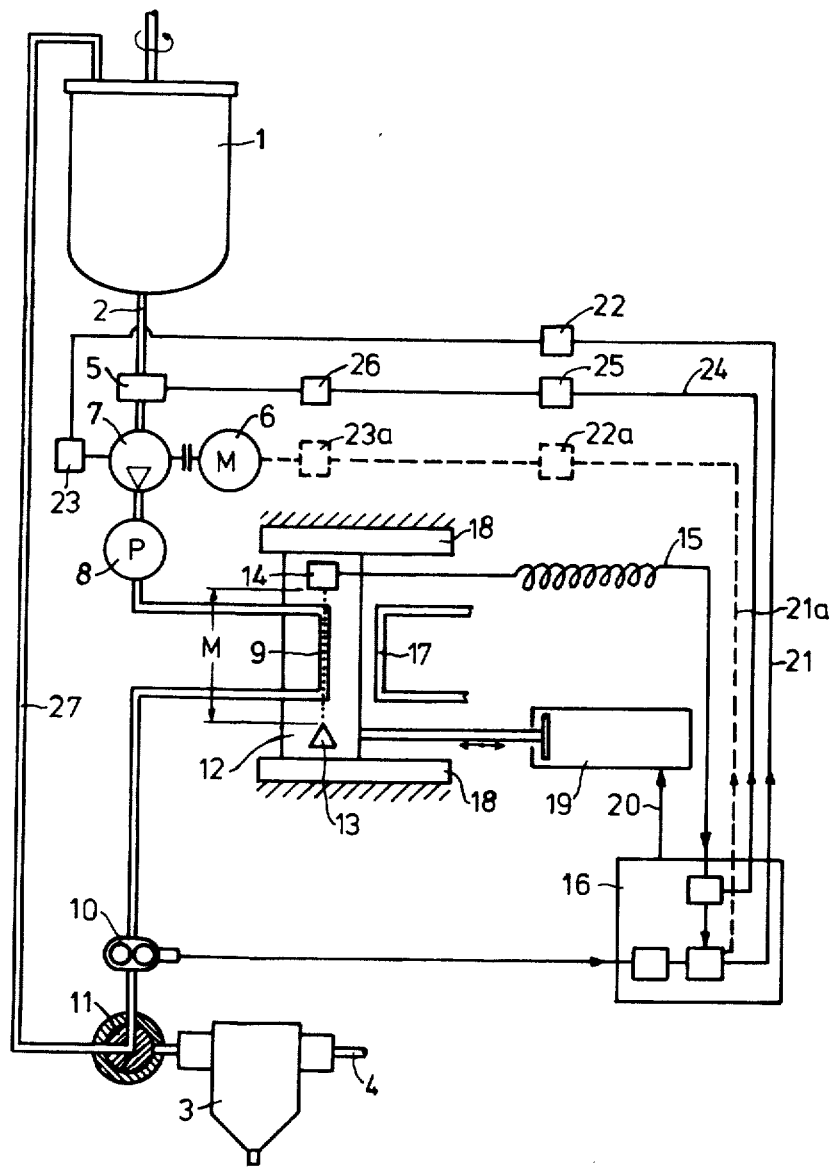

METHOD AND A DEVICE FOR THE PRODUCTION OF A SOLID-FORMING OR FOAM-FORMING FLOWABLE REACTION MIXTURE

BACKGROUND OF THE INVENTION

The invention relates to a method and a device for the production of a solid-forming or foam-forming flowable reaction mixture from at least two flowable components reacting with each other, which are fed continuously to a mixing zone and mixed together, wherein, the volumetric rate of flow of at least one component is measured and its density is determined.

It is known from German Auslegeschrift No. 2,543,302 to make the gas charge (i.e. the amount of dissolved gas in the component) of the components reproducible and measurable and, in addition, to control the gas charge automatically. For this purpose, the volume of the gas-charged reactant which is delivered per unit time is measured at a first pressure level which is kept higher or lower than a subsequent second pressure level. The reactant is then brought to a second pressure level which is kept lower or higher than the first pressure level. The volume delivered per unit time is measured again. The difference is determined as a gauge of the gas charge and this value is compared with a predetermined set value. The quantity of gas to be added is then controlled manually or by means of an automatic control device so as to maintain the set value. The production costs are high with this arrangement. Additionally, in many instances, a constant quantitative rate of flow is needed.

A method and an apparatus are known from German Offenlegungsschrift No. 2,724,132, whereby the quantitative rate of flow can be determined so that the stoichiometric metering ratio can again be adapted to the predetermined set value in the event of deviations on the basis of the measurement. For this purpose, it is necessary to use expensive apparatus in which a subsidiary stream is divided off. The quantity of material by volume which has passed through this subsidiary stream during a predetermined time interval is determined using a complicated weighing device. The density of the component is determined from this measurement as a quotient of the quantity by weight and the quantity by volume. The volumetric rate of flow is measured, from which the quantitative rate of flow of the main stream is finally determined as a product of the density of the component and the volumetric rate of flow of the main stream. The gas content of the component is not however considered during the subsequent control of the metering ratio based on quantitative rate of flow determined.

It is theoretically possible to combine the two methods and devices described above in order to achieve an end product of the desired quality. This combination would be so expensive, however, that it is unacceptable in practice.

The object of the invention is to provide a method and a device which allows both the stoichiometric metering ratio of the components and the gas content thereof to be easily controlled.

BRIEF DESCRIPTION OF THE DRAWING

The FIGURE schematically illustrates one embodiment of the present invention.

DESCRIPTION OF THE INVENTION

In terms of the present method, this object is achieved by measuring the density of the component by ratiometry successively under high pressure and under low pressure in such a way that (a) the quantitative rate of flow of the component is determined from the measurement under high pressure as a product of the density and the measured volumetric rate of flow, and the quantitative rate of flow is controlled by comparison with a predetermined set value, (b) the measurement of the density under low pressure acts as a gauge of the gas charge, and the quantity of gas necessary is controlled so as to maintain a predetermined set value by comparison of the difference between the two measured density values.

This allows the two decisive factors to be detected simultaneously and, if necessary, controlled and adjusted accordingly on the basis of these measured values using a substantially smaller number of measurements and calculations than in the previously known methods.

More particularly, the present process is a method for the production of a flowable reaction mixture from at least two flowable reactants, at least one of said reactants containing dissolved gas, comprising (a) measuring the volumetric rate of flow of at least one of said reactants which contains dissolved gas, (b) measuring the density of at least the same reactant noted in step (a) by radiometry successively under high pressure and low pressure, (c) determining the quantitative rate of flow of the reactant noted in steps (a) and (b) from the measurements of steps (a) and (b), (d) controlling the quantitative rate of flow of the reactant noted in steps (a) and (b) by comparing the quantitative rate determined in step (c) with a predetermined set value, and when necessary, adjusting said quantitative rate of flow, (c) controlling the amount of dissolved gas contained in the reactant noted in steps (a) and (b) by comparing the high pressure density measurement with the low pressure density measurement noted in step (b), the low pressure density measurement serving as a gauge for the gas charge, and, when necessary, adjusting said amount of dissolved gas, (f) feeding said flowable reactants to a mixing zone, and (g) mixing said reactants.

If components are being processed in which the quantitative rate of flow and/or the gas content are constant, it is sufficient to influence only the component which is more sensitive in this respect in the manner described above. In practice, however, a corresponding method will generally be adopted for each main component.

The new method has the particular advantage that the fundamental principles for controlling the metering ratio by means of the quantitative rate of flow, as well as those for the gas content are provided simultaneously by radiometric density measurement.

The component streams are preferably subjected alternately to radiometric density measurement. It is sufficient to measure the density at suitable, preferably periodic, intervals. It is not absolutely essential to measure the density of all components simultaneously.

The method therefore allows the stoichiometric metering ratio of the components and the gas content of the component to be controlled simultaneously on the basis of measured starting values. The quantitative rate flow of one component may be raised or the rate of flow of the other component may be lowered when it is necessary to adjust the quantitative rates of flow. Similarly, the gas charge can be controlled by supplying gas or removing gas, depending on the circumstances.

The apparatus used for carrying out the method according to the invention comprises storage containers for the components, feed pipes which lead via metering pumps provided with adjusting devices from the storage containers to a mixer head, a gas charging device and a volumetric flow counter being arranged in at least one of the feed pipes between the storage container and mixer head.

The novelty lies in the fact that a radiometric density measuring instrument is arranged between the metering pump and mixer head and has the feed pipe to the mixer head passing through its measuring length.

The cost for apparatus is reduced to a minimum by using a radiometric density measuring instrument so that only the volumetric rate of flow and the density have to be read when there is a high pressure and low pressure in the feed pipe. Once the quantitative rate of flow has been determined, the metering ratio and the gas content can be controlled manually if necessary.

According to a particular embodiment, each feed pipe is provided with a density measuring instrument. A density measuring instrument having a number of measuring lengths corresponding to the number of feed pipes can also be provided.

As an alternative, a single density measuring instrument is preferably provided for all feed pipes, and the feed pipes lie alternately in the measuring lengths thereof. These portions of the feed pipes are adapted to the measuring length. For this purpose, either the corresponding portions of the feed pipes can be introduced alternately into the measuring length or the density measuring instrument is movable and its measuring length can be placed alternately into the region of a pipe. In the first case, for example, the regions of the feed pipes are arranged on a slide or on a rotary table. In the second case, the corresponding regions of the feed pipes are mounted rigidly and the density measuring apparatus is arranged so as to be movable, for example on rails, so that its measuring length can be coordinated alternately with the individual regions of the feed pipes.

The single density measuring instrument has the advantages of less expense and also of less radiation exposure. Suitable density measuring instruments are known and are illustrated, for example, in the pamphlet 81-1-1077 published by Messrs. Berthold, Laboratorium Prof. Dr. Berthold, D-7547 Wildbad 1 about "Radiometrische Dichtemessanlage LB 370", for example FIG. 4.

The volume measuring instrument and the density measuring instrument are preferably connected to a computer. Suitable computers are standard computers with micro processors, f. e. Typ TMS 9900 of TEXAS INSTRUMENTS, U.S.A., or Typ 8080 of SIEMENS AG, Federal Republic of Germany. This allows the instantaneous quantitative rate of flow to be determined automatically from the measured value of the volumetric rate of flow and allows this value of the instantaneous quantitative rate of flow as well as the measured value of the instantaneous density to be compared with the relevant set values. The operator can then adjust the metering ratio and the gas charge accordingly, if necessary, with aid of predetermined tables.

It is particularly advantageous to design the device in such a way that control devices for the metering pump regulator and the gas charger regulator are connected to the computer. The stroke of the metering pump can be adjusted by means of the metering pump regulator or, alternatively, the regulator influences the metering pump drive means so as to vary the quantity delivered.

With this embodiment, the gas charge and the stoichiometric metering ratio can be adjusted automatically by programming the computer in such a way that the regulator is actuated if a deviation from the set value is measured.

An embodiment of the device according to the invention is illustrated purely schematically in the drawings and is described in more detail below with reference to an example of a device for the production of a foamable polyurethane reaction mixture in which only the structure of the device for the polyol component is shown in detail while the feed pipe for the isocyanate component is only indicated.

The polyol component passes from a storage container 1 via a feed pipe 2 to a mixer head 3 in which it is mixed with the isocyanate component supplied via the feed pipe 4. A gas charging device 5, a metering pump 7 provided with a drive means 6, a manometer 8, a density measuring region portion 9, a volumetric flow counter 10 as well as a change-over valve 11 are arranged in a series in the feed pipe 2.

The density measuring region portion 9 is located in the measuring length M of a radiometric density measuring instrument 12 which consists essentially of a transmitter 13 and a receiver 14. The measuring pulses received are supplied via the line 15 to a computer 16 and are displayed. The measuring region portion 17 of the feed pipe 4 is arranged as a mirror image to the measuring region portion 9. The density measuring instrument 12 can be moved transversely on rails 18 by means of a pneumatic drive means 19 so that the measuring length M can also be made to overlap the measuring region portion 17 in order to measure the density of the isocyanate component. The drive means 19 can be switched over periodically at predetermined intervals to one of the measuring region portions 9, 17 by the computer 16, as represented by the pulse line 20.

The measured value determined by the volumetric flow counter 10 is displayed by the computer 16 and multiplied by the measured density value in the computer 16. The value thus obtained represents the instantaneous quantitative rate of flow and is compared in the computer 16 with the stored set value. If a deviation is present, the computer 16 transmits a command via a line 21 to a control device 22 which transmits a corresponding pulse to a regulator 23 to regulate the stroke of the metering pump 7. Alternatively, the command can be transmitted, as indicated in broken lines, via the line 21a to the control device 22a which transmits a pulse to the regulator 23 a to regulate the motor speed of the drive means 6 so as to achieve the same result, namely the change in the quantity metered.

The difference between the density value measured under high pressure and under low pressure is compared with a predetermined set value in the computer 16 and, if necessary, a command is emitted via a line 24 of a control device 25, which line conveys a corresponding pulse to a regulator 26 of the gas charging device 5 so that the gas charge is adjusted accordingly.

The change-over valve 11 is switched to return travel so that measurement takes place at the moment under low pressure and the component is recirculated via the line 27 into the storage container 1.

The design of the device for the isocyanate side is similar. In that case, it is also possible to display the ratio of the quantitative rates of flow of the components.

What is claimed is:

1. A method for the production of a solidforming of foam-forming flowable reaction mixture from at least two flowable components reacting with each other, which are fed continuously to a mixing zone and mixed together, wherein the volumetric rate of flow of at least one component is measured and its density determined, characterized in that the density of the component is measured by radiometry under high pressure and under low pressure in succession,
    (a) the quantitative rate of flow of the component being determined from the measurement under high pressure as a product of the density and of the measured volumetric rate of flow, and the quantitative rate of flow being controlled by comparison with a predetermined set value and,
    (b) the measurement of the density under low pressure serving as a gauge for the gas charge and the quantity of gas necessary being controlled so as to maintain a predetermined set value by comparison of the difference between the two measured density values.

2. A method according to claim 1, characterized in that the component streams are subjected alternately to radiometric density measurement.

3. A device for preparing a favorable reaction mixture comprising storage containers for at least two reactive components, feed pipes which lead via metering pumps provided with regulators from the storage containers to a mixer head, a gas charging device and a volumetric flow counter arranged in at least one of the feed pipes between the storage container and mixer head, and a radiometric density measuring instrument arranged between the metering pump and mixer head through whose measuring length the feed pipe passes.

4. A device according to claim 3, characterized in that each feed pipe is provided with a density measuring instrument.

5. A device according to claim 3, characterized in that a single density measuring instrument is provided for all feed pipes and the feed pipes lie alternately in the measuring length thereof.

6. A device according to claim 5, characterized in that the feed pipes can be introduced alternately into the measuring length.

7. A device according to claim 5, characterized in that the density measuring instrument is movable and its measuring length can be placed alternately into the region of a feed pipe.

8. A device according to claim 3, characterized in that the volumetric flow counter and the density measuring instrument are connected to a computer.

9. A device according to claim 8, characterized in that control devices for a regulator of the metering pump and for the gas charging device are connected to said computer.

10. A device according to claim 8, characterized in that control devices for a regulator of the drive means of the metering pump and for the gas charging device are connected to said computer.

11. A method for the production of a flowable reaction mixture from at least two flowable reactants, at least one of said reactants containing dissolved gas, comprising
    (a) measuring the volumetric rate of flow of at least one of said reactants which contains dissolved gas,
    (b) measuring the density of at least the same reactant noted in step (a) by radiometry successively under high pressure and low pressure,
    (c) determining the quantitative rate of flow of the reactant noted in steps (a) and (b) from the measurements of steps (a) and (b),
    (d) controlling the quantitative rate of flow of the reactant noted in steps (a) and (b) by comparing the quantitative rate determined in step (c) with a predetermined set value, and when necessary, adjusting said quantitative rate of flow,
    (e) controlling the amount of dissolved gas contained in the reactant noted in steps (a) and (b) by comparing the high pressure density measurement with the low pressure density measurement noted in step (b), the low pressure density measurement serving as a gauge for the gas charge, and, when necessary, adjusting said amount of dissolved gas,
    (f) feeding said flowable reactants to a mixing zone, and
    (g) mixing said reactants.

* * * * *